Oct. 27, 1964  P. B. SHAFFER  3,154,704
RESILIENT MOTOR MOUNTING
Filed Jan. 18, 1961
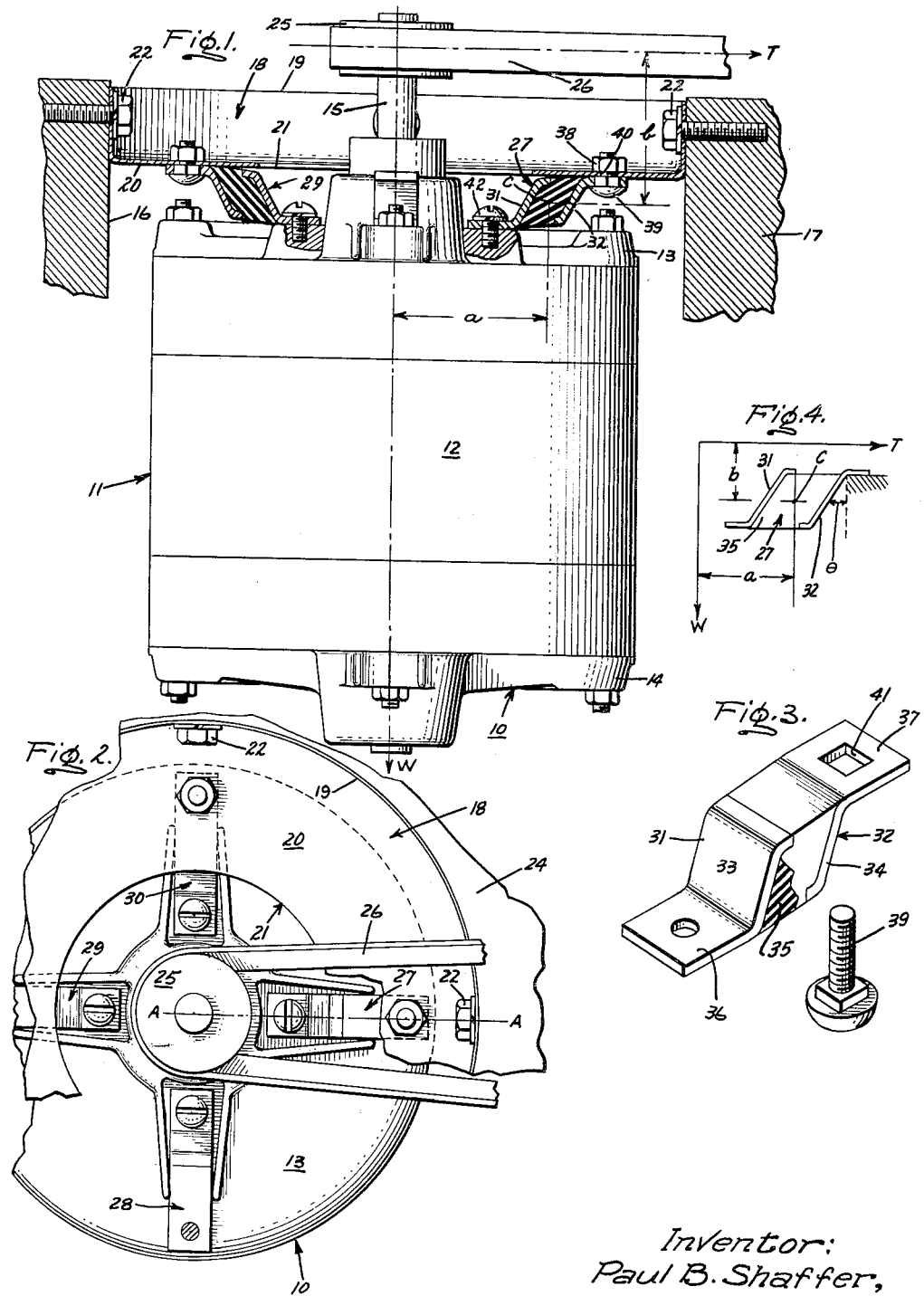
Inventor:
Paul B. Shaffer,
by John M. Stoudt
Attorney.

United States Patent Office 3,154,704
Patented Oct. 27, 1964

3,154,704
RESILIENT MOTOR MOUNTING
Paul B. Shaffer, De Kalb, Ill., assignor to General Electric Company, a corporation of New York
Filed Jan. 18, 1961, Ser. No. 83,396
3 Claims. (Cl. 310—51)

This invention relates to an improved motor mounting arrangement and more particularly to an improved vibration isolating resilient mounting construction for supporting an electric motor in a non-horizontal position.

It is important, of course, that a motor used to operate domestic and mechanical apparatus; e.g. washing machines, be suitably supported so that vibrations and noises produced by the motor during its operation are not transmitted from the motor frame to components of the apparatus which may be resonant to the exciting frequency of the energized motor. This problem of effective vibration and noise isolation becomes even more acute in those situations where the motor is suspended in a non-horizontal position from a main support of the apparatus and has a frictional driving connection (e.g., belt) with the device to be driven. For instance, the mounting means is subjected to certain stresses, such as axial, torsional, and radial forces, resulting from the weight and vibratory motion of the motor itself during operation as well as from the pull or tension caused by the taut driving connection, which also causes a shearing action on the mounting means. Thus, it has become conventional to support non-horizontal motors by resilient cushion rings, generally provided at each of the motor ends. However, this type of mounting construction has not proven to be completely satisfactory, for in some motor applications, the motor must be suspended and supported at only one of its ends. Then, too, the cushion ring type mounting is not readily adaptable for use with a variety of motor frame configurations and is relatively expensive to employ.

In view of these factors and considerations, there has been a practical difficulty in providing a satisfactory mounting arrangement, which is capable of withstanding and isolating the motor vibrations and other forces from the driven apparatus and main motor supporting structure for a long period of time, especially in those situations employing frictional type driving connections. Further, the cost of manufacturing, installing, and maintaining the mounting construction must be low enough to permit its use in the mass production manufacture of domestic apparatus.

Accordingly, it is an object of this invention to provide an improved mounting arrangement for a motor or other machine whereby the vibrations produced by the motor during its operation will be effectively isolated.

It is another object of this invention to provide an improved, yet relatively inexpensive, means for isolating motor vibrations particularly effective in those situations in which the motor is supported at only one of its ends in a non-horizontal position.

It is yet another object of the present invention to utilize the frictional driving connection between the motor and the apparatus to be driven for reducing shearing and other stresses on the motor mounting thereby increasing the longevity and effectiveness of the mounting arrangement.

In carrying out the objects in one form thereof, I provide an improved arrangement for suspending an electric motor from a supporting structure with the motor shaft being disposed in a substantially vertical position. A frictional driving connection driven by the shaft is arranged above the supporting structure. The means for suspending the motor from the supporting structure includes at least one vibration isolating member formed with a resilient body which has means for attachment to the motor and a rigid tapered section which is secured to the supporting structure. One isolating member is positioned below the frictional driving connection such that the weight of the motor when multiplied by its moment arm taken about the centroid of the isolating member is approximately equal to the tension of the driving connection multiplied by its moment arm. With this interrelationship of parts, the driving connection and the vibration isolating block cooperate to prevent the effective transmission of motor vibrations to the support member and to prevent the motor from tilting with respect to the axis of the frictional driving connection.

The subject matter which I regard as my invention is particularly pointed out and distinctly claimed in the concluding portion of this specification. My invention, itself, however, both as to its organization and method of operation, together with further objects and advantages thereof, may best be understood by reference to the following description taken in connection with the accompanying drawing:

FIG. 1 is a side view, partially in cross section of an electric motor being supported by the novel mounting construction of the present invention in one form thereof;

FIG. 2 is a plan view of the motor and supporting arrangement shown in FIG. 1, the view being partially broken away to illustrate detail;

FIG. 3 is a view in perspective of one of the resilient mounting members and the securing screw of FIG. 1; and FIG. 4 is a schematic diagram of the forces exerted on one of the resilient mounting members to show the relationship of its construction to the weight of the motor and to the pull of driving connection.

Referring now to FIGS. 1 and 2 of the drawing, numeral 10 identifies an electric motor of the type commonly employed to operate domestic washing machines and other apparatus having relatively small electrically driven members, e.g., rotatable clothes baskets (not shown). Motor 10 is conventionally formed with a frame 11 including a central housing 12 and a pair of end shield assemblies 13 and 14 and has a rotatable rotor shaft 15 extending upwardly (as viewed in the drawing) through end shield 13. Motor 10 is shown as being supported in a non-horizontal position in a cylindrical type opening defined by vertical walls 16 of a main stationary supporting structure, generally indicated by numeral 17, forming part of the apparatus which houses the driven member. A mounting plate 18, preferably formed from sheet material into a generally cup-shaped member, having an outer annular flanged portion 19 and a radially inner depressed portion 20 provided with a central opening 21, is secured to walls 16 of main supporting structure 17 by any suitable means, such as by a plurality of spaced apart bolts 22 which pass through suitable apertures in the annular flanged portion 19 and are received in tapped holes 23 provided in main supporting structure 17. Rotor shaft 15 preferably projects through plate opening 21 to a point above top surface 24 (as viewed in FIG. 1) of main supporting structure 17.

A flexible frictional driving connection is provided between motor 10 and the driven member, the illustrated connection consisting of a pulley and belt arrangement. More specifically, a suitable pulley 25 is fixedly secured to the upper end of rotor shaft 15, axially beyond and above top surface 24 of supporting structure 17, and is operatively connected to the device to be driven by a belt 26 in the usual manner. This may be accomplished, for example, by attaching a second belt pulley to the driven device (not illustrated) and arranging belt 26 in frictional engagement with both pulleys. The construction thus far described is by way of illustration only, and it will be apparent to those skilled in the art that the present invention is applicable to other types of stationary supporting structure and driving connection means.

For suspending motor 10 below mounting plate 18, four identical vibration isolating members or blocks 27, 28, 29 and 30 respectively are employed in the preferred embodiment. As best seen in FIG. 3, each block consists of a pair of rigid tapered sections 31 and 32, preferably formed of metal having spaced apart parallel side portions, 33 and 34 respectively, and a resilient or elastic body 35, such as rubber, separating and isolating the tapered sections from one another. Body 35 may be fixedly attached to side portions 33 and 34 in any suitable manner, as by a vulcanized connection. At its lower end (as viewed in the drawing), section 31 is formed with a foot 36 which extends away from portion 33 and resilient body 35. In a like but reverse fashion, section 32 has a foot 37 formed at its upper end, which projects away from side portion 33 and resilient body 35 in a plane substantially parallel to that of lower foot 36.

In order to obtain the optimum advantage of my invention, the magnitude of both the weight of motor 10 and the tension or pull of the driving connection is directly related to the preferred location of one of the vibration isolating blocks previously described; i.e., block 27, between the motor and the driven member, as well as to the slope angle of rigid section 32 which is fastened to the stationary supporting frame. More specifically, as seen in FIG. 2, block 27 preferably has rigid section 32 secured in a rigid and fixed manner to the lower surface of mounting plate 18 substantially centrally of belt 26; i.e., between the individual runs of the belt, adjacent the belt center line or axis A—A which passes through the rotational axis of motor shaft 14. The illustrated securing means is a nut 38 and screw 39 which projects through suitably aligned apertures 40 and 41 respectively provided in plate 18 and foot 37 of rigid member 32. Motor 10 is, in turn, secured to and suspended from rigid section 31 of block 27, by screw 42 extending through lower foot 36 and received in a tapped hole disposed in the end shield assembly 13. The other three blocks 28, 29 and 30 may be secured at equally and angularly spaced apart positions between plate 18 and motor 10 by means similar to that discussed for block 27.

Block 27 is mounted to the stationary structure such that the moment of force on block 27 causes the block to be primarily subject to compressive forces thereby minimizing shearing stresses on the resilient body 35 of the block. This is accomplished (see FIGS. 1 and 4) by taking the moment about the centroid $c$ of resilient body 35 and making the total value of the magnitude of the motor weight W multiplied by its perpendicular moment arm $a$ approximately equal to the tension or pull of the belt T multiplied by its moment arm $b$. In other words, theoretically, $Wa=Tb$, where W and T are measured in pounds of force and $a$ and $b$ are linear distances. For purposes of illustration, if a motor weighing thirteen pounds is suspended 2.17 inches perpendicularly from the centroid $c$ of block 27 and the line of action of the belt is 1.68 inches above centroid $c$, then ideally, the belt tension $$T = \frac{2.17 \text{ inches} \times 13 \text{ pounds}}{1.68 \text{ inches}}$$

or 16.8 pounds and under these conditions, there is a minimum of shearing stress exerted on block 27. Of course, if the belt tension is required to be a particular value, then pulley 25 may be moved vertically on shaft 14 to provide the proper moment arm $b$.

Further, angle $\theta$ between a line drawn perpendicular to the line of action of the belt and side 34 of section 32, is the tangent of the numerical value of the vertical acting motor weight W divided by the horizontal belt force T. Expressed algebraically $$\text{Tangent } \theta = \frac{W}{T}$$

Using the example given above to illustrate this concept, Tan $\theta=13.0/16.8$ or $\theta=37°\ 45'$. With side 34 built with a slope of 37° 45′ under the given conditions, the pivot point or centroid $c$ will be in equilibrium and proper isolation of the motor vibrations is achieved.

With the foregoing relationship of parts, the blocks effectively resist tilting or lateral movement of the motor with respect to belt axis A—A, normally resulting from belt loading by deflecting like hinged cubes under compression or tension, while the belt tension is advantageously utilized to minimize shearing stresses in the blocks. In addition, it has been found that torque fluctuations in the motor during operation and unbalanced rotor conditions of a mechanical or electrical nature, which would usually tend to set up vibrations in the motor frame, are effectively prevented from being transmitted to the stationary motor supporting structure and other components of the driven apparatus. Furthermore, and equally important, the improved vibration isolating arrangement of the present invention is capable of long and continuous use without requiring the periodic change or replacement of the isolating blocks, thus permitting the motor to be mounted in relatively inaccessible positions in the domestic and mechanical apparatus.

It should be apparent to those skilled in the art, while I have shown and described what at present is considered to be the preferred embodiment of my invention in accordance with the patent statutes, changes may be made in the structure disclosed without actually departing from the true spirit and scope of this invention, and I therefore intend to cover in the following claims all such equivalent variations as fall within the invention.

What I claim as new and desire to secure by Letters Patent of the United States is:

1. A motor mounting arrangement comprising an electric motor having a rotatable shaft disposed in a non-horizontal position, a support member, a frictional driving connection including a pulley attached to and driven by said shaft and a continuous belt driven by said pulley, means for mounting said motor to said support member and for isolating motor vibrations from said support member, said means including at least one vibration isolating block having a resilient body and a rigid section attached together with said section being secured to said support member, means for connecting said motor and said resilient body together at a location in spaced relation to said section, the securement between said support member and rigid section of one of the vibration isolating blocks being disposed vertically beneath and generally between the individual runs of said belt, said one isolating block supporting the motor such that the weight of the motor and the tension force of the driving connection respectively create moments in opposed directions around the centroid of said resilient body thereon, whereby the magnitudes of shear stresses introduced in said resilient body of said one block are effectively controlled and the transmission of motor vibration to said support member during operation of said motor is reduced.

2. A motor mounting arrangement comprising an electric motor suspended from a support member with the motor shaft disposed in a substantially non-horizontal position having a portion extending above said support member, an element attached to and driven by said portion, a continuous driving connection driven by said element arranged above said support member, at least one vibration isolating member for suspending said motor from said support member, one isolating member formed with a firm body of resilient material and an elongated rigid section attached securely together, means securing said elongated rigid section to said support member generally below said driving connection with said elongated rigid section extending away from said securing means toward said motor, so that the weight W of the motor acts around said one isolating member in opposed relation to the force T of the driving connection, with the tangent of the angle defined between an outer surface of said elongated rigid section and a line drawn perpendicular to the force of the driving connection at the securement of said elongated rigid section to said support member being related to the numerical value of $W/T$, whereby the magnitudes of shear stresses introduced in said resilient body of said one isolating member and the transmission of motor vibration to said support member are effectively controlled during operation of said motor.

3. In an arrangement for suspending an electric motor, a support member, a rotatable shaft disposed in a non-horizontal position having a portion extending above said support member, an element attached to said shaft portion for rotation therewith, a continuous driven connection having separated runs driven by said shaft portion above and adjacent said support member, and means for suspending the motor from said support member and for isolating from said support member the vibrations produced by said motor during its operation, said means including a plurality of angularly spaced apart vibration isolating members, one of said isolating members at least having a firm body of resilient material and an elongated rigid section secured together with one end of said section connected to said support member vertically below and generally between said separated runs, and means for fastening together said motor and said resilient body, said one vibration isolating member being positioned below said driving connection such that the weight of the motor multiplied by its moment arm taken about the centroid of said one vibration isolating member is approximately equal to and opposes the tension force of said driving connection multiplied by its moment arm taken about said centroid so that the tension of said driving connection assists in preventing motor vibrations from being transmitted to the support member through said vibration isolating member during operation of the motor.

References Cited in the file of this patent

UNITED STATES PATENTS

| | | |
|---|---|---|
| 1,834,450 | Flintermann | Dec. 1, 1931 |
| 1,924,504 | Lee | Aug. 29, 1933 |
| 2,188,807 | Castricone | Jan. 30, 1940 |
| 2,941,766 | Van Ranst | June 21, 1960 |